Figure 1:
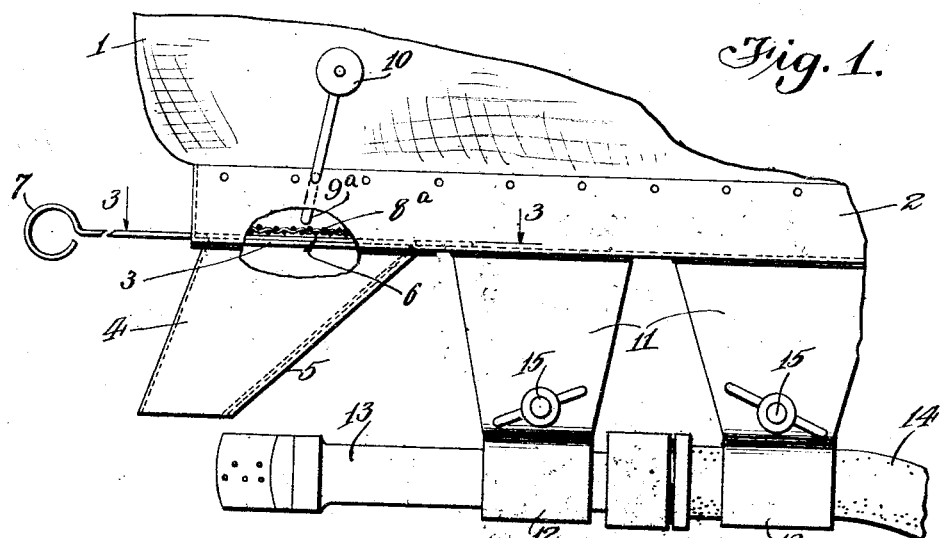

June 24, 1930.                G. F. MILLER                1,766,667
                    APPARATUS FOR SPREADING FERTILIZER
                         Filed March 6, 1928

Inventor
George F. Miller
By Lyon & Lyon
Attorneys

Patented June 24, 1930

1,766,667

UNITED STATES PATENT OFFICE

GEORGE F. MILLER, OF LOS ANGELES, CALIFORNIA

APPARATUS FOR SPREADING FERTILIZER

Application filed March 6, 1928. Serial No. 259,407.

This invention relates to an apparatus for spreading fertilizer upon lawns or other seeded, grassy, or cultivated plots of ground. The invention is particularly directed towards means for uniformly and rapidly distributing fertilizers in pulverulent or granular form over the ground.

It is well known that best results may be obtained by the use of fertilizer on cultivated grounds by distributing the fertilizer uniformly and immediately thereafter sprinkling or washing the green matter upon which the fertilizer has been placed so as to prevent the growing matter from being burned or otherwise injured by intimate contact with the acids and salts present in fertilizer for any length of time. When small plots of cultivated ground are to be fertilzed, for example small gardens or lawns, it is rather difficult to spread the fertilizer uniformly as there are no devices available for raking or distributing fertilizer over small portions of ground. Ordinarily distribution of fertilizer under these conditions is accomplished by hand and this method is incapable of insuring an even distribution of the material.

As has been mentioned before, green growing matter is injured by directly coming in contact with the various natural and artificial fertilizers, and it is quite desirable to spray or wash the fertilizer down into the ground as soon after application as possible. As a matter of fact, it has been generally recommended to spray the ground both before and after the application of fertilizer so as to insure rapid removal of the fertilzer from the green or growing vegetation such as grass, etc.

This invention relates to means for distributing fertilizers in any required quantity uniformly, rapidly and with little effort. The apparatus embraced by this invention permits the distribution of fertilizer in powdered or granular form by means of a flowing stream of water, that is, the fertilizer is applied to the ground simultaneously with a stream of water.

An object of this invention is to provide means for distributing fertilizing materials uniformly over the ground. Another object is to provide an apparatus for distributing fertilizing materials in powdered or granular form by means of a flowing stream of water.

A still further object of this invention is to provide a portable device adapted to distribute fertilizing material by means of a flowing stream of water.

In order to clearly describe my invention, reference will be made to a simple form of device such as is shown on the attached drawings. It will be understood that the device minutely described hereinafter is only one form of the device capable of being utilized in the carrying out of the method, and numerous changes and modifications may be made in its construction without departing from the spirit of the invention.

Figure 3:
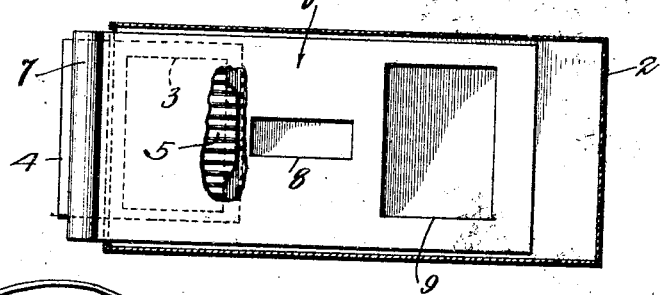
Figure 2:
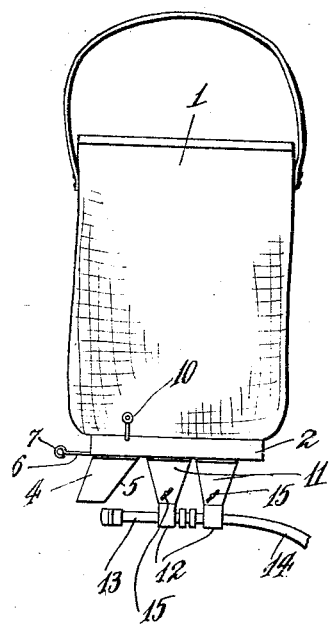

In the drawings:

Figure 1 is a side elevation, partly broken away, showing one form of device adapted to distribute powdered or granular fertilizing materials by means of a flowing stream of water; Figure 2 is a front elevation of the device; Figure 3 is a horizontal section taken along the line 3—3 of Figure 1.

The device shown in the drawings comprises a suitable receptacle 1 made of any desired material, for example cloth, having an opening in the top thereof through which finely divided powdered or granular fertilizing material may be placed within the container 1. The bottom edges of the container may be suitably attached to a metallic bottom or pan 2 so as to maintain the container 1 (when it is made of cloth or other pliable material) from losing its form. An opening 3 may be formed in the forward portion of the bottom portion 2 beneath which is suitably attached a feed chute or spout 4. The lower portion 5 of the feed chute is preferably made of corrugated material with the corrugations extending downwardly from near the opening 3. A slide 6 provided with an exteriorly extending handle 7 may be suitably and movably positioned upon the bottom of the container 2 so as to selectively uncover or cover the opening 3. Preferably, the slide 6 is provided with two openings, a smaller opening 8 and a larger opening 9 of substantially the same size as the opening 3. It will be seen that by manipulating the slide 6 in a longitudinal direction various quantities of powdered or granular fertilizing material may be allowed to escape from the container 1 and out through the feed chute 4. Identifying indices may be provided along the upper surface of the slide 6 near the handle 7 so as to indicate to the operator using the device which opening in the slide 6 corresponds with the opening 3 in the bottom of the container 2.

Furthermore, a screen 8ª of rather open mesh, for example having openings from ¼" to ½" in size, depending upon the character of the fertilizing material being distributed, may be positioned above the opening 3 so as to break up any aggregates which may have been formed in the container 1. In order to further assist the disintegration of any aggregates and to insure an even flow of fertilizing material from the container, a small agitator 9ª may be provided. In its simplest form the agitator may consist of a heavy wire journaled in the vertical sides of the metallic bottom 2 of the container and bent in the container so as to describe an arc immediately above the screen 8ª. One end of the wire 9ª may be bent at right angles exteriorly of the metallic bottom 2 so as to enable a handle 10 to be attached thereto and enable the agitator to be activated by operation of the handle.

The entire device may be connected by means of a suitable apron or aprons 11 and clamps 12 to a nozzle 13 and a water hose 14. The clamps 12 may be attached firmly to the nozzle and hose by means of bolts and wing nuts 15. Any type of nozzle may be used but a flat fish-tail nozzle is preferred, inasmuch as a larger surface area may be covered thereby and the distribution of fertilizing materials accomplished much more readily. Nozzles of this character eject a flat stream of water to which it is possible to apply finely divided or granular materials, whereas it is impossible to apply such materials to a round stream of water. The tip of the nozzle 13 should preferably come immediately in back of the feed spout 4 so as to enable the fertilizing materials discharged therefrom to come in contact with the stream of water being emitted from the nozzle 13.

The operation of the device illustrates a preferred method of distributing fertilizing materials very readily. After the container 1 has been filled with fertilizer and the device attached to a hose and nozzle, the hose being connected to a source of water, the operator may then proceed to spray or irrigate the ground in uniform rows and during such spraying of water he may distribute the fertilizer in any desired quantity by merely enabling the opening 3 to communicate with the interior of the container 1 by proper manipulation of the slide 6. The fertilizing material falling out of the spout 4 comes in contact with the stream of water emitted by the nozzle 13 and is carried by said stream of water onto the ground. Inasmuch as the volume of water generally exceeds the volume of fertilizer very materially, the fertilizer is immediately washed off in green or growing vegetation into the roots thereof. In this manner all deleterious effects upon the growing matter are obviated as the fertilizing materials do not remain in contact with the growing matter but are immediately washed into the soil. Furthermore most fertilizing materials contain soluble salts which are of no avail to plant life until they are put into solution and by this method all of the soluble constituents are immediately brought into the proper form for plant assimilation.

As has been said before, the quantity of fertilizing materials applied in the above described manner may be varied by manipulating the slide 6. In addition, the speed of application may be varied so as to influence the total quantity of fertilizer applied per square yard or other unit of ground area. For example, if the operator is applying the fertilizing materials by walking along a strip of lawn he may double the quantity of fertilizing material being applied per unit area by reducing his speed of locomotion one half or by maintaining the same speed and increasing the size of the opening communicating with the interior of container 1.

It is to be understood that this invention is not limited in its use to application of fertilizing materials alone by means of a flowing stream of water but is also applicable to the distribution of various corrective agents, such as lime, either alone or mixed with the fertilizer. Furthermore, the device of the character described may be utilized in both fertilizing and seeding simultaneously as for example by mixing a certain quantity of seed with fertilizer and then applying it to the ground in the manner hereinbefore described. It will be understood that my invention is not limited to the distribution of ground or granular and substantially dry corrective agents, but may also be used in diluting and disseminating crystallized corrective agents or concentrated solutions of the same by merely adapting the receptacle and valved outlet to accommodate a liquid corrective agent.

Numerous changes and modifications may be made in the particular construction and arrangement of parts comprising my illustrated device without departing from the spirit of the invention and I desire to include all such modifications and changes as come within the scope of the following appended claims.

I claim:

1. An apparatus for spreading finely divided fertilizing materials comprising, a receptacle for finely divided fertilizing material, an outlet in the bottom of said receptacle, means for detachably attaching the receptacle to a water hose and nozzle, said nozzle being adapted to discharge a flat stream of water, means for controlling the size of the opening in the bottom of said receptacle, a spout positioned beneath said opening and terminating above and in front of said nozzle, and means on the lower surface of said spout for uniformly distributing fertilizing material passing through said spout over the upper surface of the flat stream discharged by said nozzle.

2. A portable device of the character described comprising, a receptacle for pulverized and granular fertilizing material, an opening in the bottom of said receptacle, movable means for regulating the size of said opening, a screen positioned above said opening, an agitator positioned above said opening, means for attaching the receptacle to a hose and nozzle, said nozzle being adapted to discharge a flat stream of water, and means for directing and distributing the flow of pulverized fertilizing material from said opening to a point immediately above and in front of said nozzle.

3. A portable device of the character described comprising, a flexible cloth container for pulverized and granular fertilizing material, a strap attached to the upper portion of said container, an opening in the bottom of said container, movable means for regulating the size of said opening, means positioned in the container adapted to assist material in said container into the outlet, means for attaching the receptacle to a hose and to a nozzle adapted to discharge a substantially flat, wide stream of water, a means for directing a flow of pulverized fertilizing material from said opening to a point immediately above and in front of said nozzle so as to distribute said fertilizing material over the upper surface of the stream discharged by said nozzle.

Signed at Los Angeles, California, this 20th day of February, 1928.

GEORGE F. MILLER.